(No Model.) 4 Sheets—Sheet 2.
J. B. CLINE.
APPARATUS FOR STREET CAR PROPULSION.
No. 244,713. Patented July 19, 1881.
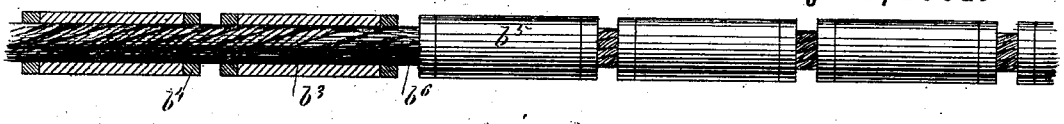
Fig. 3.
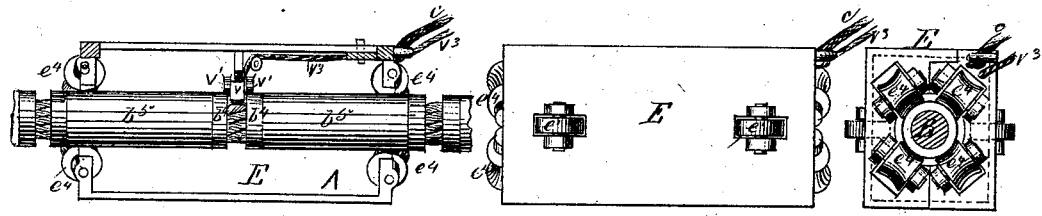
Fig. 6. Fig. 4. Fig. 5.
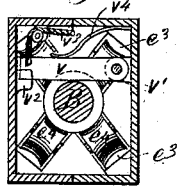
Fig. 7.
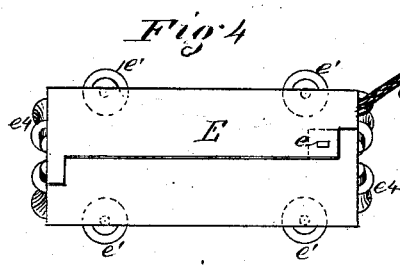
Fig. 8.
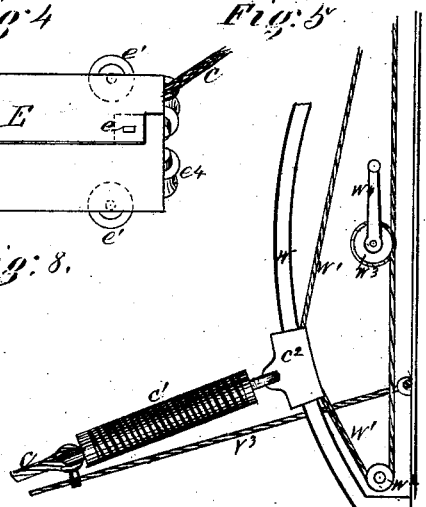
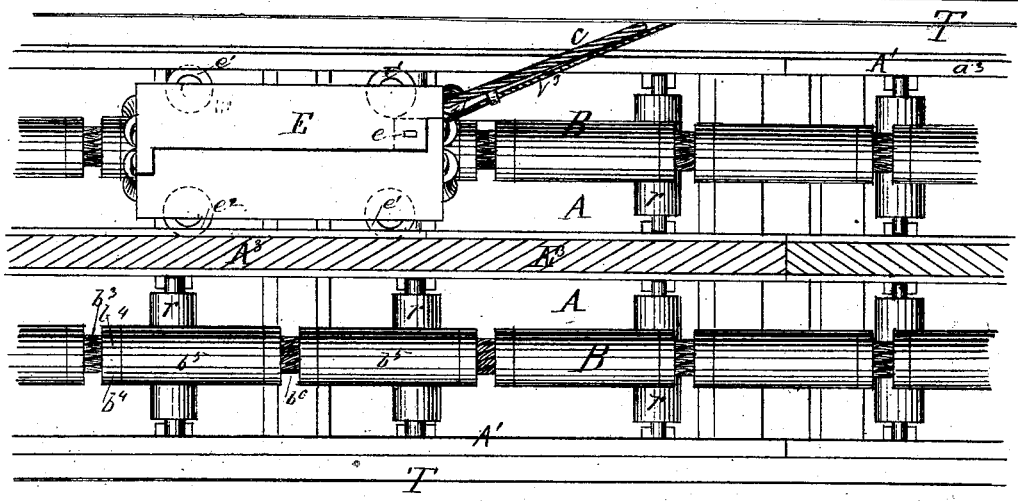
Fig. 9.
Witnesses:
C. L. Parker
R. H. Whittlesey
Inventor
Joseph B. Cline
By Attorney
George H. Christy
N. PETERS, Photo-Lithographer, Washington, D. C.

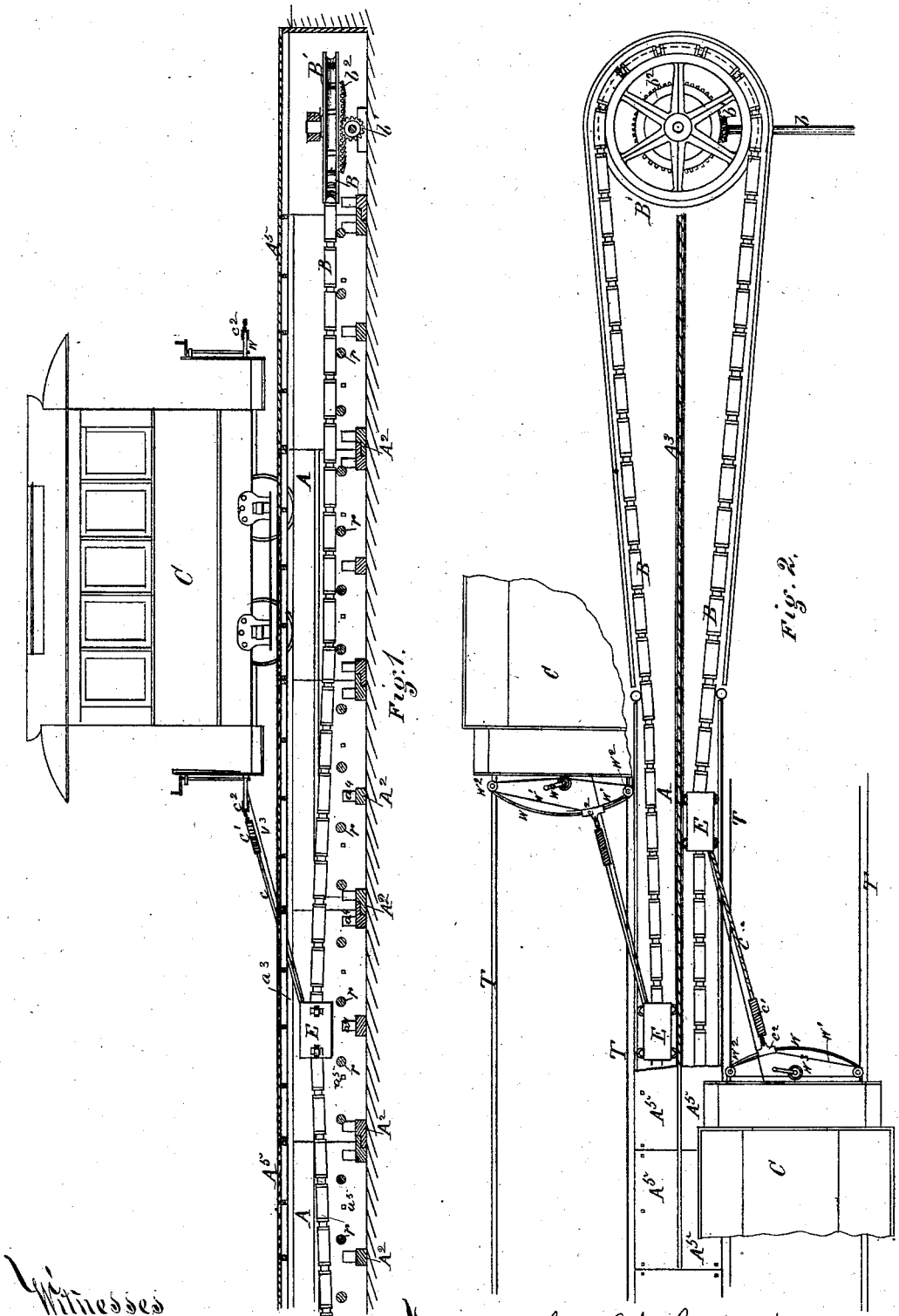

(No Model.)  4 Sheets—Sheet 3.

J. B. CLINE.
APPARATUS FOR STREET CAR PROPULSION.

No. 244,713.  Patented July 19, 1881.

Witnesses.
C. L. Parker
R. H. Whittlesey

Inventor Joseph B. Cline
By Attorney George H. Christy (No Model.)　　　　　　　　　　　　　　　　4 Sheets—Sheet 4.
J. B. CLINE.
APPARATUS FOR STREET CAR PROPULSION.
No. 244,713.　　　　　　　　　Patented July 19, 1881.

Witnesses
C. L. Parker
R. H. Whittlesey

Inventor Joseph B. Cline
By Attorney George H. Christy

UNITED STATES PATENT OFFICE.

JOSEPH B. CLINE, OF ALLEGHENY, ASSIGNOR OF ONE-HALF TO JOSEPH S. BROWN, OF BELLEVUE, PENNSYLVANIA.

APPARATUS FOR STREET-CAR PROPULSION.

SPECIFICATION forming part of Letters Patent No. 244,713, dated July 19, 1881.

Application filed February 14, 1881. (No model.)

*To all whom it may concern:*

Be it known that I, JOSEPH B. CLINE, of Allegheny, county of Allegheny, State of Pennsylvania, have invented or discovered a new and useful Improvement in Apparatus for Street-Car Propulsion; and I do hereby declare the following to be a full, clear, concise, and exact description thereof, reference being had to the accompanying drawings, making a part of this specification, in which like letters indicate like parts.

Figure 14:
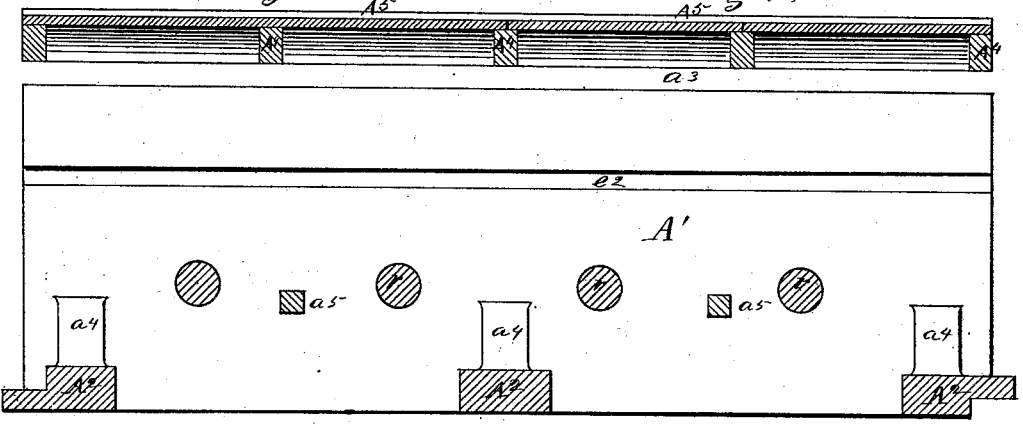
Figure 15:
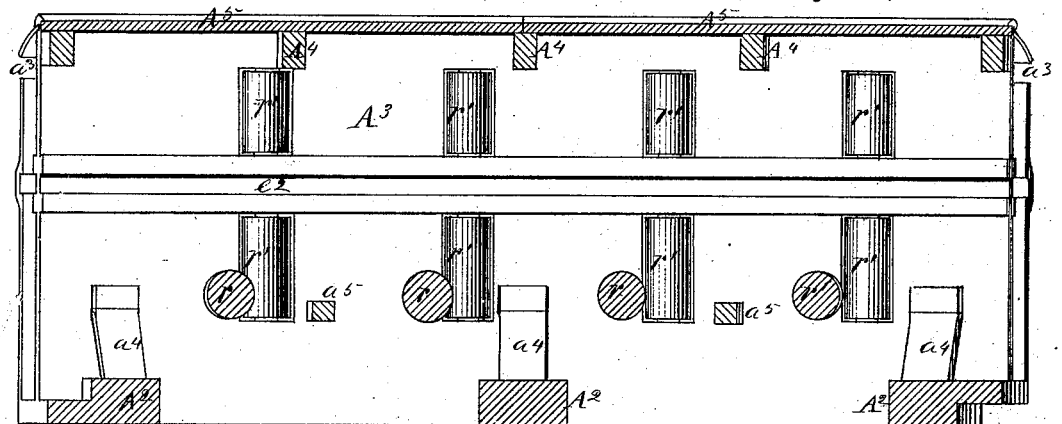
Figure 16:
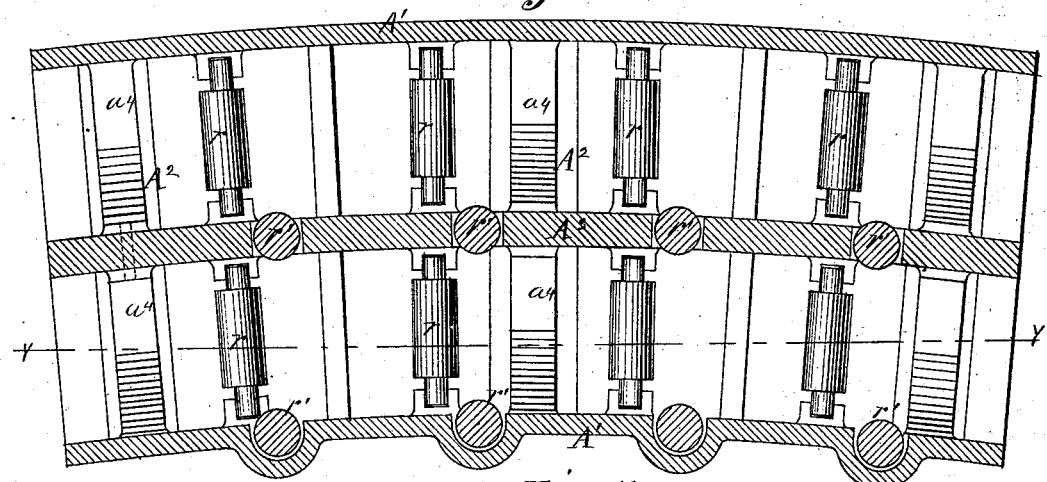
Figure 17:
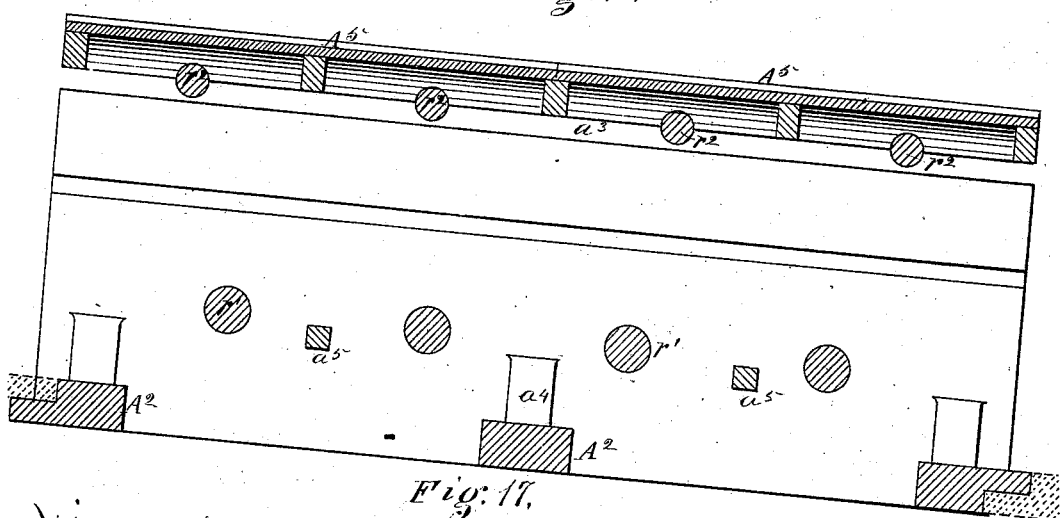

Figure 1, Sheet 1, is a sectional longitudinal view of a section of apparatus as arranged for street-car propulsion in accordance with the present invention. Fig. 2 is a plan view of the same, but with the cover-plates of the power-chamber removed the better to illustrate the construction and operation. The remaining figures are to an enlarged scale and show details of the construction. Fig. 3, Sheet 2, illustrates the construction of the rope employed. Figs. 4 to 8 show the traveling box, Fig. 4 being a side view, Fig. 5 an end view, Fig. 6 a vertical longitudinal central section, Fig. 7 a transverse vertical section, and Fig. 8 a top view. Fig. 9 is a top view with the cover-plates removed and with the central rib sectioned a little below its upper edge, and illustrative of the draft attachments as connected with the car. Figs. 10 to 13, Sheet 3, show, by cross-sections through the power-chamber, different modifications of the same as adapted for use on straight and curved tracks and on grades. Fig. 14 is a longitudinal section in the plane of the line $x\,x$, Fig. 10. Figs. 15 and 16, Sheet 4, show vertical and horizontal longitudinal sections of a power-chamber as adapted to a curved track, and Fig. 17 is a vertical longitudinal section of the same as employed on a rising grade.

My present invention relates to certain improvements in apparatus for the propulsion of street-cars by stationary steam-power, whereby to dispense with the necessity of employing horses or an independent engine for each car. A stationary engine at the terminus of the line or of a section of the line, is employed to operate an endless rope or chain, which passes down and back through a power-chamber, along the entire length of line or section, and around a drive-wheel at one or both ends of the line or section, or if a drive-wheel is used only at one end of the line or section, then around a loose wheel at the other end. This rope or chain passes through a series of traveling boxes, one for each car, and each car is connected with one of such boxes. Each box has a clutch or lock mechanism, by means of which the box is caused to be engaged with or released from the rope, and such lock or clutch is under control of the car-conductor. Provision is also made for varying the line of draft at the pleasure of the conductor.

The details of these and other features of construction will now be explained as embodied on a double-track road. Two cars of such a road are shown at C running on tracks T.

For the purposes of the present description I will assume that the rope and power-chamber run the entire length of the line; but the line may be divided into sections, if so preferred, or if it be too long for a single rope, and the apparatus be duplicated on the succeeding sections.

Between the two or double tracks T, and with its top at or far enough above the level of the track to provide for drainage, I lay what I term a "power-chamber," A. This chamber is made of side plates, $A'$, Figs. 10 to 14, united at the bottom by cross-bars $A^2$ at suitable intervals, and of a central longitudinal plate, $A^3$, which is united to the cross-bars $A^2$ by dowel-pin joints $j$, as in Figs. 10 and 12. This longitudinal central plate, $A^3$, is cast with outwardly-projecting bars $A^4$ at suitable intervals, for supporting cover-plates $A^5$. Each bar $A^4$ has at its outer end an upturned pin, $a$. The cover-plates $A^5$ are placed in position by inserting one edge of each into a groove, $a'$, made in the upper side face of the central plate, $A^3$, and a hole in the cover-plate at the proper point comes over the pin $a$, and a key, $a^2$, is inserted to secure it in place. These parts are so proportioned that an open slit, $a^3$, will be left along each upper corner of the working-chamber, along its entire length, and of suitable size for the running therein of the draw-rope. The vertical plates which form the power-chamber are further strengthened by diagonal braces $a^4$ and cross horizontal braces $a^5$ in any desired number or order. Thus constructed the power-chamber is divided into two chambers, which, however, being alike, I designate by the same letter.

Figure 12:
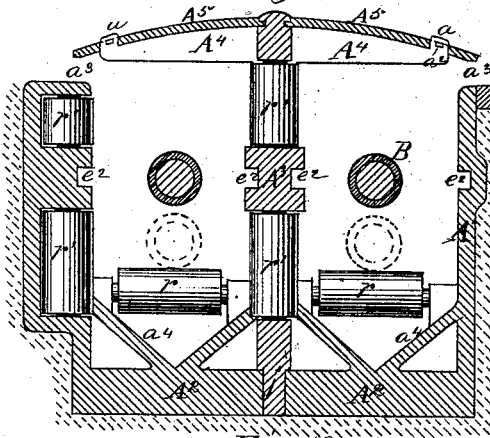

An endless rope or chain, B, passes down one side chamber and back in the other, and at the end of the line around a drive-wheel, B', Figs. 1 and 2, to which a driving-power of any suitable stationary engine may be applied in any convenient way—as from a shaft, $b$, by bevel-pinion $b'$ and bevel-gear $b^2$. I prefer to use a rope of substantially the construction shown in Fig. 3, where $b^3$ represents an ordinary twisted-wire rope. On this, at intervals of two and sixteen inches alternately, I securely affix, by shrinking on or otherwise, a series of iron or steel collars, $b^4$, and the longer spaces between collars I fill with gutta-percha $b^5$, leaving the shorter spaces $b^6$ empty, so that the locking devices and drive-wheel sprockets may the more readily engage the rope. But in order that the rope may be properly supported, I arrange along the lower part of each half of the power-chamber a series of rollers, $r$, and rest their bearings in suitable seats or boxes in the side plates. In connection with a track both straight and level, side and top rollers will not be necessary; but on a curved track, and along the inside of the curve, vertical rollers $r'$ should be set in the side plates, A', as also in the central plate, $A^3$, as illustrated in Figs. 12, 13, and 15, and the arrangement of the horizontal bottom rollers will be as in Fig. 16.

Figure 10:
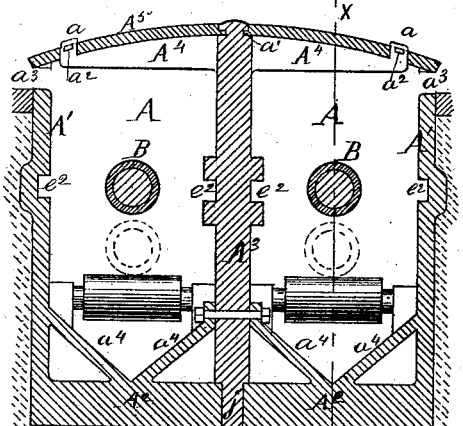
Figure 11:
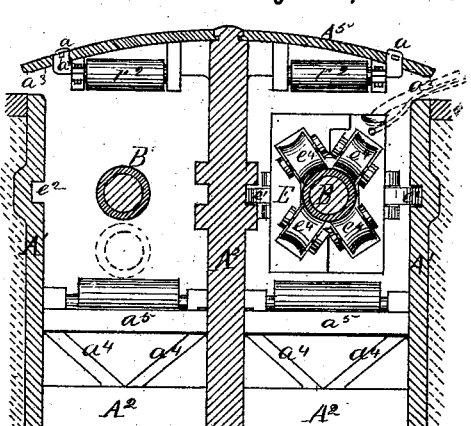
Figure 13:
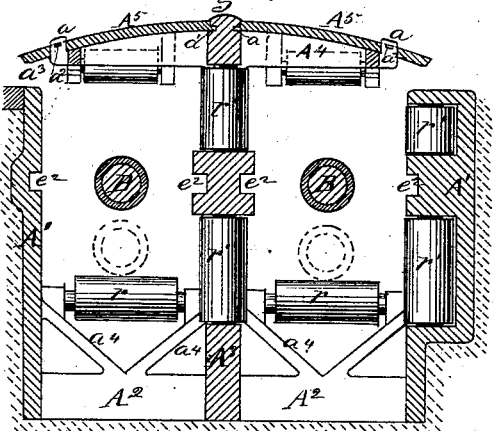

In connection with a track on an up or down grade, top rollers, $r^2$, will be inserted in suitable bearings arranged between the ribs $A^4$, as illustrated in Figs. 11, 13, and 17. These rollers are intended, under the conditions named, to afford a bearing for the rope, so that it shall run or operate with a minimum of friction; and such rollers are so spaced that a traveling box, E, may have room to traverse the spaces in the chamber A above the lower rollers, $r$, and inside the side rollers, and beneath the upper ones, wherever such are employed. This box E, Figs. 1 to 8, is made in two parts, Fig. 8, in such manner that each half may be put on opposite sides of the rope B, and the two halves may then be secured together by one or more pins or keys, $e$, whereby provision is made for putting in, taking out, or replacing such boxes on the rope as the requirements of the service may dictate, and for this purpose any of the cover-plates $A^5$ may be raised and replaced.

In order that the boxes may be properly guided in their travel along the chamber A, I provide them with side wheels, $e'$, which run in slots $e^2$ made for that purpose in the side and central walls or plates of the chambers. The ends of each box are made closed, except that oblique slits, $e^3$, Fig. 7, are provided, and in such slits, mounted in suitable bearings, I arrange concave-faced friction-rollers $e^4$, so spaced and relatively arranged that the rope B may be passed endwise through the box and between said rollers, as in Figs. 5 to 7. The upper outer corner of the box, when arranged in its chamber, will then be in such proximity to the longitudinal slit $a^3$, Figs. 1, 2, 9, and 11, that a draw-rope, $c$, connected therewith, may be passed out through the slit and attached to the car. Now, to interlock the box and rope so that as the rope travels it will take the box with it, and so draw the car, and also provide means for unlocking when desired, so that the box and car may be stopped when necessary, while the motion of the rope continues, any suitable locking or griping apparatus capable of being worked from the car may be employed; but I have shown one construction of such apparatus which I now believe to be the best.

Inside the box, Fig. 7, I pivot a latch, $v$, in such position that it may be dropped into or pulled out of one of the short spaces $b^6$, Fig. 3, of the rope. This latch $v$ is firmly supported at one end by the pivotal lugs $v'$, and at its other end, when interlocked with the rope, by the side lips of a recessed lug, $v^2$. In order to enable the conductor to draw it out of its interlocking engagement with the rope B, I attach to it a cord, $v^3$, and carry the same out through the slit $a^3$, Figs. 1, 2, and 11, and into the car. Then the conductor, by pulling this cord, can at pleasure unlock his box from the rope B, and by the use of his brake stop the car. When he is ready to start again he loosens the cord, and a spring, $v^4$, Fig. 7, presses the latch down so as to cause it to enter the next following space $b^6$ of the rope B. The rope will then take the box and car along; but in order to guard against breakage in thus starting the car, I insert one or more draft-springs, $c'$, Fig. 9, in the draw-rope $c$, which leads from the box E to the car. Such spring or springs may have any required degree or amount of tension, or even a variable tension, small at first, but increasing in amount as the car gets in motion. The construction of such springs is well known in the art and need not further be described.

In an apparatus thus constructed the car will necessarily be drawn by a force acting obliquely to its direction of motion. Hence I attach the draw-rope $c$ to the car the proper distance to one side of its fore-and-aft center line; and as the degree of obliquity will vary somewhat when changing from a straight to a curved track, or vice versa, I provide for varying at pleasure the point on the car at which the drawing-power is applied. To this end I attach to the car end or platform a bow-shaped or curved draw-bar, $w$, Figs. 2 and 9, and place a sliding clip, $c^2$, thereon, to which clip the draw-rope $c$ is attached. A stout cord, $w'$, is attached by one end to each end of the clip, and this cord, after passing around the sheaves at or near the ends of the draw-bar $w$, one of which sheaves is shown at $w^2$, passes tightly around a wheel, $w^3$, so that as such wheel is turned in either direction by a crank, $w^4$, the clip $c^2$ will be caused to slide one way or the other along the draw-bar $w$, and thereby the conductor may vary the obliquity of the line of draft relative to the direction or line of car motion, so as practically to overcome the objection of side draft which would otherwise be liable to arise.

The crank $w^4$ should, of course, be within easy reach of the conductor, as illustrated in Fig. 1.

Various modifications, such as will occur to the skilled mechanic, may be made in the structure of the details of the apparatus by the substitution of mechanical equivalents or otherwise, and such modifications are hereby included herein.

For a single track the power-chamber A should be divided longitudinally, and one-half be laid on each side of the track, but with the slit $a^3$ in each half next the track. The curved draw-bar $w$, extending clear across the end of the car, provides a range of motion for the sliding clip $c^2$ such that any car may be run in either direction on either track.

I claim herein as my invention—

1. In combination with rope B, a series of boxes, E, one for each car, each box having rope-bearing rolls $e^4$ at the ends thereof, and exterior side bearing-wheels, $e'$, adapted to run in slots $e^2$ in the lateral walls of the power-chamber A, substantially as set forth.

2. A power-rope for street-car propulsion consisting of central wire rope, $b^3$, metal rings $b^4$, and india-rubber filling $b^5$, in the alternate spaces between the rings, leaving short spaces $b^6$ for the action of a locking mechanism, substantially as set forth.

3. The combination, with box E and its interior and exterior rollers, and with the rope B passing through the same, of a locking-bar or latch, $v$, forced or held in engagement with the rope by a spring, and released from such engagement by a cord extending into the car, substantially as set forth.

4. As a means for varying the line of draft of a street-car drawn by power applied along the side of the track, a curved draw-bar, $w$, a sliding clip, $c^2$, thereon, and a shifting-cord, $w'$, in combination with sheaves $w^2$ and shifting-wheel $w^3$, substantially as set forth.

5. A power-chamber consisting of side plates provided with slots $e^2$ and removable top plates, $A^5$, arranged substantially as set forth with reference to giving a slit, $a^3$, along the upper corner next the car-brake.

In testimony whereof I have hereunto set my hand.

JOSEPH BENTON CLINE.

Witnesses:
R. H. WHITTLESEY,
C. L. PARKER.